(12) United States Patent
Lyons et al.

(10) Patent No.: US 9,646,312 B2
(45) Date of Patent: May 9, 2017

(54) ANONYMOUS PLAYER TRACKING

(75) Inventors: Martin S. Lyons, Beaconsfield (AU); Robert Linley Muir, Sydney (AU)

(73) Assignee: GAME DESIGN AUTOMATION PTY LTD, Turramurra (AU)

( * ) Notice: Subject to any disclaimer, the term of this patent is extended or adjusted under 35 U.S.C. 154(b) by 1136 days.

(21) Appl. No.: 12/265,260

(22) Filed: Nov. 5, 2008

(65) Prior Publication Data

US 2009/0118002 A1    May 7, 2009

Related U.S. Application Data

(60) Provisional application No. 60/985,982, filed on Nov. 7, 2007, provisional application No. 60/985,985, filed on Nov. 7, 2007.

(51) Int. Cl.
*G07F 17/32* (2006.01)
*G06Q 30/02* (2012.01)

(52) U.S. Cl.
CPC ............. *G06Q 30/02* (2013.01); *G07F 17/32* (2013.01); *G07F 17/3239* (2013.01)

(58) Field of Classification Search
CPC .................................................. G07F 17/3239
USPC ....................................................... 463/25, 29
See application file for complete search history.

(56) References Cited

U.S. PATENT DOCUMENTS

| | | | |
|---|---|---|---|
| 5,655,961 A | 8/1997 | Acres | |
| 6,142,876 A | 11/2000 | Cumbers | |
| 6,612,928 B1 | 9/2003 | Bradford et al. | |
| 6,641,484 B2 | 11/2003 | Oles et al. | |
| 6,758,751 B2 | 7/2004 | Soltys et al. | |
| 6,902,484 B2 | 6/2005 | Idaka | |
| 6,990,217 B1 | 1/2006 | Moghaddam et al. | |
| 7,035,626 B1 | 4/2006 | Luciano, Jr. | |
| 7,048,630 B2 | 5/2006 | Berg et al. | |
| 7,175,528 B1 * | 2/2007 | Cumbers | 463/29 |
| 7,288,025 B1 | 10/2007 | Cumbers | |
| 7,311,605 B2 * | 12/2007 | Moser | 463/25 |
| 7,506,172 B2 * | 3/2009 | Bhakta | 713/186 |
| 2002/0010629 A1 * | 1/2002 | Diamond | 705/14 |
| 2002/0087392 A1 * | 7/2002 | Stevens | 705/10 |
| 2003/0110038 A1 | 6/2003 | Sharma et al. | |
| 2005/0009600 A1 * | 1/2005 | Rowe et al. | 463/29 |
| 2005/0134685 A1 | 6/2005 | Egnal et al. | |
| 2006/0019745 A1 * | 1/2006 | Benbrahim | 463/29 |
| 2006/0066719 A1 | 3/2006 | Haering et al. | |
| 2006/0072010 A1 | 4/2006 | Haering et al. | |
| 2006/0148560 A1 * | 7/2006 | Arezina et al. | 463/29 |
| 2006/0148561 A1 * | 7/2006 | Moser | 463/29 |
| 2006/0222209 A1 | 10/2006 | Zhang et al. | |
| 2006/0232673 A1 | 10/2006 | Lipton et al. | |
| 2006/0262958 A1 | 11/2006 | Yin et al. | |
| 2006/0268111 A1 | 11/2006 | Zhang et al. | |
| 2006/0291694 A1 | 12/2006 | Venetianer et al. | |
| 2006/0291695 A1 | 12/2006 | Lipton et al. | |
| 2007/0013776 A1 | 1/2007 | Venetianer et al. | |
| 2007/0052803 A1 | 3/2007 | Chosak et al. | |
| 2007/0058717 A1 | 3/2007 | Chosak et al. | |
| 2007/0087834 A1 * | 4/2007 | Moser et al. | 463/42 |

(Continued)

*Primary Examiner* — Jay Liddle
(74) *Attorney, Agent, or Firm* — Davis Wright Tremaine LLP; Philip H. Albert

(57) ABSTRACT

An enhanced method of Casino and hotel probable customer and customer demographic identification, game selection, advertising and customer service based on the identification.

25 Claims, 4 Drawing Sheets

(56) References Cited

U.S. PATENT DOCUMENTS

2007/0117623 A1* 5/2007 Nelson et al. .................. 463/29
2007/0122000 A1   5/2007 Venetianer et al.
2007/0127774 A1   6/2007 Zhang et al.
2007/0167210 A1* 7/2007 Kelly et al. .................... 463/16
2007/0250898 A1  10/2007 Scanlon et al.
2008/0188308 A1* 8/2008 Shepherd et al. ............. 463/39
2008/0300049 A1* 12/2008 Anderson et al. ............. 463/25

* cited by examiner

ANONYMOUS PLAYER TRACKING

RELATED APPLICATIONS

The present application claims the benefit of earlier filing date and right of priority to U.S. Patent Application Ser. No. 60/985,982, filed Nov. 7, 2007, and U.S. patent application Ser. No. 12/265,221, Lyons I, filed on same date herewith and which claims priority to U.S. Provisional Patent Application Ser. No. 60/985,985, filed Nov. 7, 2007, all of which are hereby expressly incorporated by reference in their entireties.

FIELD OF THE INVENTION

The present invention relates generally to identification and probable identification of customers and customer demographics at Casinos and hotels, game selection, advertising and customer service based on the identification.

BACKGROUND OF THE INVENTION

A gaming machine includes but is not limited to slot machines of the type manufactured by Aristocrat Technologies or International Gaming Technologies. Many other types of gaming are available in casinos and for the sake of clarity this document describes implementations with slot machine, but it equally applies to other types of gaming devices.

Cell phones have been used as tickets to gaming entry to events, with a bar code being sent to the phone and the bar code being scanned at the event entry point to gain admittance.

The company Veritec has products to allows two-dimensional (2D) bar codes to be transmitted to cell phones and used for coupons, gift certificates, and event tickets.

The Internet search engine GOOGLE® selects placement of advertising to display on web page search results in part according to the amount bid by advertisers, with a higher bid getting a better placement on the web page or pages. See U.S. Pat. No. 7,136,875, entitled "Serving advertisements based on content".

Multigame gaming machines have more than one game available for play and the player selects a game to play from a menu. With current technology it is possible to place a large number of games on the gaming machine, such that it is difficult for the player to choose a game to play, and in the future this problem will become worse.

For example, the initial game selection may show 10 games that can be selected, while in the future the entire library of games available may be more than 1000.

U.S. Patent Application Publication No. 20070054738 teaches a multigame gaming system wherein the gaming system prioritizes games for player selection according the players game preferences as determined by their play history and the preferences of other players who liked the same games.

Client Server and downloadable gaming systems allow the selection of games from those available on a server, and potentially include the entire library of games from the manufacturer.

Due to technological limitations, there may be a noticeable delay when the player selects a different game to that already playing as the game needs to be loaded from secondary storage or the across a network into main memory prior to play commencing. Typically, some or all of a game will be run from dynamic random-access memory (DRAM), which is very fast but has limited capacity, and games are loaded into DRAM for execution by the central processing unit (CPU) from Hard disk, CD-ROM, or across a network. For security, the gaming machine may also authenticate the game prior to execution to check it has not been tampered with, and this authentication may also introduce a delay. Both standalone and client server gaming systems can experience such delays. See U.S. Pat. No. 5,643,086.

Gaming regulations in some states require that when a new game is selected from the system for downloaded (rather than being selected by the player), that the gaming machine must have been not been played for some time before a new game may be downloaded.

When no players are playing the gaming machine it goes into an attract mode, where it shows a game or games that are available for play.

Traditional player tracking systems use magnetic cards or smartcards encoded with a unique identification number to identify players to the gaming system when the player inserts the magnetic card into a card reader in a gaming machine. Prior to the card being inserted the system does not know the identity of the player; however once inserted, the system knows with certainty the identity of the card owner, and hence assuming the player is the owner.

U.S. Pat. No. 5,655,961 shows a bonusing system, in which player tracking is provided via a magnetic card carried by a player and which the player inserts into a magnetic card reader in a gaming machine to identify the player to the machine and/or the entire system.

Casinos award complimentary services and/or items ("comps") to players in order to attract them back the casino in the future. Typically, comps include free meal and/or rooms. The value of comps awarded is usually calculated as a proportion (typically about 30%) of the player's theoretical losses, with the player tracking system being used to track the players betting history and hence determine the theoretical loss.

The company "locate mobiles.com" offers an Internet based cell phone tracking service. Standard cell phones can be located and tracked to an accuracy of up to 50 meters by measuring time delay and signal strength, and hence distance, to multiple cell phone base stations and use triangulation to determine the location. The location is shown on an Internet based map.

Many cell phones and PDAs incorporate BLUETOOTH® radio transceivers, which have a unique MAC address that is remotely detectable. The company Tadlys Wireless Communications sells the Topaz Location System for location tracking Bluetooth tags and BLUETOOTH® enabled devices including cell phones to an accuracy of 2-3 meters.

U.S. Pat. No. 7,035,626, entitled "Remote gaming using cell phones with location and identity restrictions," discloses a cell phone with location detection used to determine a players jurisdiction and hence ability to gamble.

Automated facial recognition uses computer systems to automatically recognize people from camera or video surveillance. Systems have been installed and tested in a number of cases, including the American Super Bowl XXXV, the London Borough of Newham and Boston's Logan airport.

U.S. Pat. No. 6,142,876, entitled "Player tracking and identification system," discloses the use of facial recognition in Casino player tracking systems.

U.S. Pat. No. 6,758,751, entitled "Method and apparatus for monitoring casinos and gaming," discloses facial recognition used to detect undesirable players in a casino game.

Gender may be determined from facial and voice analysis as described in U.S. Pat. No. 6,990,217 and U.S. Patent Application Publication No. 20030110038.

U.S. Pat. No. 7,175,528, entitled "Passive biometric customer identification and tracking system," discloses the use of biometric identification in a casino.

U.S. Pat. No. 7,288,025, entitled "Apparatus and method for controlling and preventing compulsive gaming," discloses biometric and facial recognition to prevent gaming by undesirable players.

U.S. Pat. No. 6,902,484, entitled "Game machine and network system for setting up game environment thereof," discloses setting up a gaming machine from a players account based on their facial identification from a camera on the gaming machine.

U.S. Pat. No. 6,641,484, entitled "Gaming machine including security data collection device," discloses a gaming machine with camera and microphone.

U.S. Pat. No. 6,612,928, entitled "Player identification using biometric data in a gaming environment," discloses authenticating a player at a gaming machine.

Automated gait recognition is able to detect gender with a reasonable degree of accuracy.

The company OBJECTVIDEO® sells automated surveillance equipment for gaming applications, including security, counting people in/out of stores, bars, restaurants and on the casino floor, traffic pattern analysis, crowd density monitoring, and/or dwell time indication around specific gaming tables.

Automatic number plate recognition is a well established technology dating back to the 1980's, and can be used to track car movement in real time. Most main roads and motorways in the city of London's congestion charge zone have automatic number plate recognition for the automatic charging of road use.

The company Silicon Gaming release a product in about 2000, that embedded a camera into a gaming machine and displayed the player's image in the game.

From the magazine Strictly Slots Magazine "Family Feud!", around 2000.

"To the right of the main video screen is a small replica of a television camera. It is a real camera that captures the image of the player and incorporates it into the game screen during the bonus round."

U.S. Pat. No. 7,048,630, entitled "System for and method of capturing a player's image for incorporation into a game," discloses a camera in a gaming machine used to capture a player's picture.

Casino's typically present advertising to groups of players using large graphic displays on the ends of banks of gaming machine, and at other locations within the casino.

SUMMARY OF THE INVENTION

In a first aspect of the invention, there is disclosed a method of identifying and/or tracking people in a hotel or casino without them carrying specially provided identification devices.

In an embodiment a customer's electronic devices are associated with the customer and tracked, and correlated with the other forms of tracking within the hotel or casino.

In an example embodiment, hotel rooms are assigned to customers in a way to improve the ability of identifying which devices are carried by the customer.

In a second aspect of the invention, there is disclosed a method of identifying people in a hotel or casino without requiring them to use a specially provided identification device and preferably determining a probability of the identification being correct.

A further aspect of the invention includes a method of tracking individuals in a hotel or casino, and preferably determining a probability that the individual tracked is the same individual at differing points in time.

In a further aspect of the invention, there is disclosed a method of identifying and/or tracking people in a hotel or casino, comprised of providing them an identification device and correlating the location of the device with the location and identity provided by biometric identity and tracking system.

Another aspect of the invention includes a method to detect groups of players and in games where these is the potential for collusion between players, to assign seating such that the possibility of players collusion is reduced.

Another aspect of the invention is a method to detect groups of players or players and casino staff and in games where there is the potential for collusion between players to advise casino staff of the possibility they may be colluding.

In an embodiment, the customer is provided with a radio-frequency identification (RFID) device with a unique identifier (ID) that is associated with the customer and which can be tracked in the hotel/casino, and may also be used in place of the traditional player tracking card.

A further aspect of the invention includes a method of identifying a people in a casino comprised of tracking the person using a means including biometric identification and assigning a probability that the person is identified correctly.

A further aspect of the invention includes a method to change the behavior of a gaming machine or group of gaming machines according to gaming preferences of one or more players approaching the gaming machine they previously played, the preferences being determined by from the players gaming history and preferences stored on the player tracking system, or from the statistical preferences of the players demographic.

A further aspect of the invention includes method to detect when a player is close and/or approaching the gaming machine and prevent the current game and/or attract mode game changing to another game.

A further aspect of the invention includes a method to preloads into main memory the next game or games most likely to be played in a gaming machine.

A further aspect of the invention includes a method to change the behavior of a gaming machine or group of gaming machines according to gaming preferences of one or more players close to the gaming machine, the preferences being determined from the players gaming history and preferences stored on the player tracking system, or from the preferences of the players demographic.

A further aspect of this invention includes a method to detect and create social groups on the gaming floor, to enhancing the players enjoyment of their visit as they have an increased chance of meeting people they enjoy socializing with and increasing the effectiveness of advertising and targeted attract mode games on gaming machine.

A further aspect of this invention includes a method of awarding comps to persons based on the probability of their being the person owed the comps. In a further aspect of this invention is a method of advertising presented to display players based on the data from the player tracking system about those players.

A further aspect of this invention includes to measure the response by players to the advertising and present this response to the casino operators to allow them to review and further optimize the selection of advertising.

A further aspect of this invention includes a method of selecting advertisements for presentation to individual players based on the gaming history and preferences of the identity or probable identity of the player.

A further aspect of the invention includes a method of selecting advertisements for presentation to individual players based on the statistics of the players identified demographic.

A further aspect if the invention includes a method of managing the relationships between staff and customers, where interactions between staff and customers are recorded and made available to staff for later interactions, enabling staff to provide a more personalized service to customers.

Another aspect of the invention includes a method to detect an electronic device that a person is carrying, and when they enter a geographic area to offer a service or advertisement to that person.

A further aspect of the invention includes a method of delivering messages, whereby messages are only delivered when specified rules are met, comprising a message for delivery and rules specifying associated with the message that specifying conditions under which the message will be delivered.

Another aspect of the invention includes a method to select games for presentation to the players detected using the anonymous player tracking system and according to bids using the methods as shown in Lyons I.

Where this disclosure refers to gaming machines and traditional player tracking systems it is not limited to any particular implementation of gaming machine or tracking system or type of game, and is applicable to various implementations including stepper machines, video machines, table games, standalone gaming machines and client server architectures. The implementation of gaming machines using traditional standalone or client server architectures is well understood, and it is obvious to a person skilled in the art how an implementation of the methods disclosed on one architecture can be implemented on the other architecture.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Anonymous Player Tracking

Figure 1:
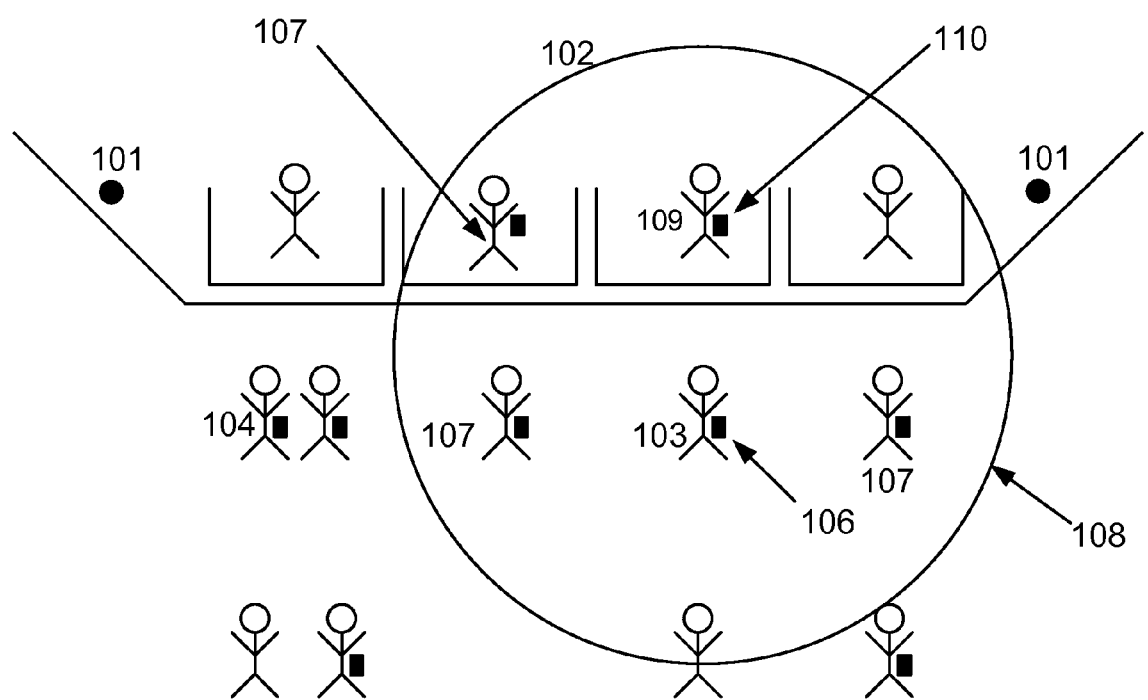
FIG. 1 is a diagrammatic illustration of a check-in location of a hotel lobby.

One aspect of the invention provides a system for identifying people in a hotel or casino without requiring them to use a specially provided identification device and preferably determines a probability of the identification being correct.

Another aspect of the invention is a method to track individuals in a hotel or casino, and preferably to determine a probability that the individual tracked is the same individual at differing points in time. The identity of the tracked individual may or may not be known. When the identity of a previously unknown person is discovered that identity information is associated with the tracking data, preferably with an associated probability the identification is correct. The probability the identification is correct may be determine and recorded for the entire gaming and location, or may be individually determined and for each recorded location and game play (e.g., each gamble).

Tracking and identification and by differing sensors is correlated to improve the accuracy of identification and tracking.

Another aspect of the invention is to determine demographic information about people, and a probability or confidence that the person is of that identified demographic.

Reference biometric data, and photos from which people may be identified is captured at points where a person's identity is known with a high degree of confidence, for example at the hotel check in desk when the present their ID, or when they use their player tracking card in a gaming machine. In the case of the gaming machine a photo may be captured by a camera in the gaming machine, or an external camera such as a security camera, that is directed to take a picture of the player by the tracking system. In the event that reference data is captured on more than one occasion and is significantly different it may indicate that the person who is identified is a different person, may be attempting fraud, and the system would notify the staff for further investigation.

The output of the recognition and tracking systems typically include, in addition to the identity or tracking, a confidence in it being correct. Traditionally this confidence value would be compared to a threshold value above which the identification or tracking would be used and below which it would be not, and the confidence value would be of no further use. In this invention the confidence (also referred to in this document as probability) is kept and used to enable application of the identity or tracking that would not otherwise be feasible, and to improve applications where is might be feasible but not optimal. It is an advantage of this invention that it allows the hotel/casino to use identification that is less than 100% accurate.

The automated identification and tracking may be supplemented by human recognition. Where confidence in recognition or tracking is poor, or an application requires a higher degree of confidence than is available, the system may refer the captured data to a human operator for checking. Where there are multiple possible alternates in the identity or tracking each of these is presented to an operator who makes a decision if they as to the identity or tracking if possible, and indicates a confidence in their decision being correct. The operator decision is combined with the identification or tracking confidence in the system such that a high confidence decision by the human operator will significantly influence the confidence on the system, resulting in an identification or tracking that may be of use whereas before it was not.

Where the accuracy of the anonymous player tracking system is sufficiently high then it may be used in place of player tracking cards to identify players at a gaming machine.

Multi-Sensor Identification

There are currently no biometric sensor technologies that are suitable for use in a hotel/casino that can provide perfectly accurate player identification or tracking. However combining the data from multiple sensors can improve the accuracy of identification and tracking, and associating a probability or confidence with the identification allows the hotel/casino to use identification that is less than 100% accurate.

Combining voice analysis with facial analysis can improve gender recognition over either technique used in isolation.

Gaming machines may be fitted with microphones to detect speech by players sitting at the gaming machine. The gaming machine may also be fitted with a video camera to record the players face. Both face and speech may be analysed to identify the person and/or to determine demographic data, such as age, gender, or ethnicity. Voice may also be analysed to determine spoke language. The casino may also have cameras and/or microphones fitted in other places than gaming machines for the same purpose, and these may be shared with other functions such as the casino security surveillance. Data from multiple camera and/or microphones is analyzed to track individuals.

Associating Trackable Electronic Devices with Customers

Many people carry electronic devices such as cell phones or PDA's that can be electronically located to a given physical area, hence locating the person carrying the device. Using current technology the location can be determined with an accuracy of about 2 m for BLUETOOTH® and 50 meters for a cell phone, which is likely to encompass a number of people, making it infeasible to uniquely identify the holder from the device alone. Devices may also use other technologies, such as WiFi. A further difficulty lies in identifying the person carrying the device—without knowing who holds the device then even if the person can be located accurately their the device cannot be used to identify them.

In the preferred implementation the location of individuals within the casino is tracked by both biometric means such as facial and/or voice analysis, by tracking the electronic devices within the hotel/casino, and correlation of location and movement between biometric and device tracking is used to improve the accuracy of identification and tracking.

It is desirable to identify the people being tracked, as there is other useful information typically that can typically be known and used, such as gaming preferences. It is desirable to identify the person carrying the electronic device, as while same person carries the device it provides a high degree of accuracy, hence it is desirable to associate the tracked electronic device with the person carrying it.

Association of devices with people is done by tracking location and movements of electronic devices and of people carrying it and correlating both measurements to find the probability that each person in the hotel/casino (or tracked area) carries each device, and analysing the resulting data to determine if it is clear that that the device is associated with a single person, in which case the device is associated with the person with the determined probability. It is possible that a group of people, such as a family, will cause one or more devices to correlate with relatively high probability with more than one person, in which case the device is associated with the person to the lesser probability so determined, and a more accurate association will hopefully be determined by chance as the group separate at some point. Preferably the tracking, correlation, and association is not a single a single measurement, but is performed on a continuous basis with results being constantly updated.

Figure 2:
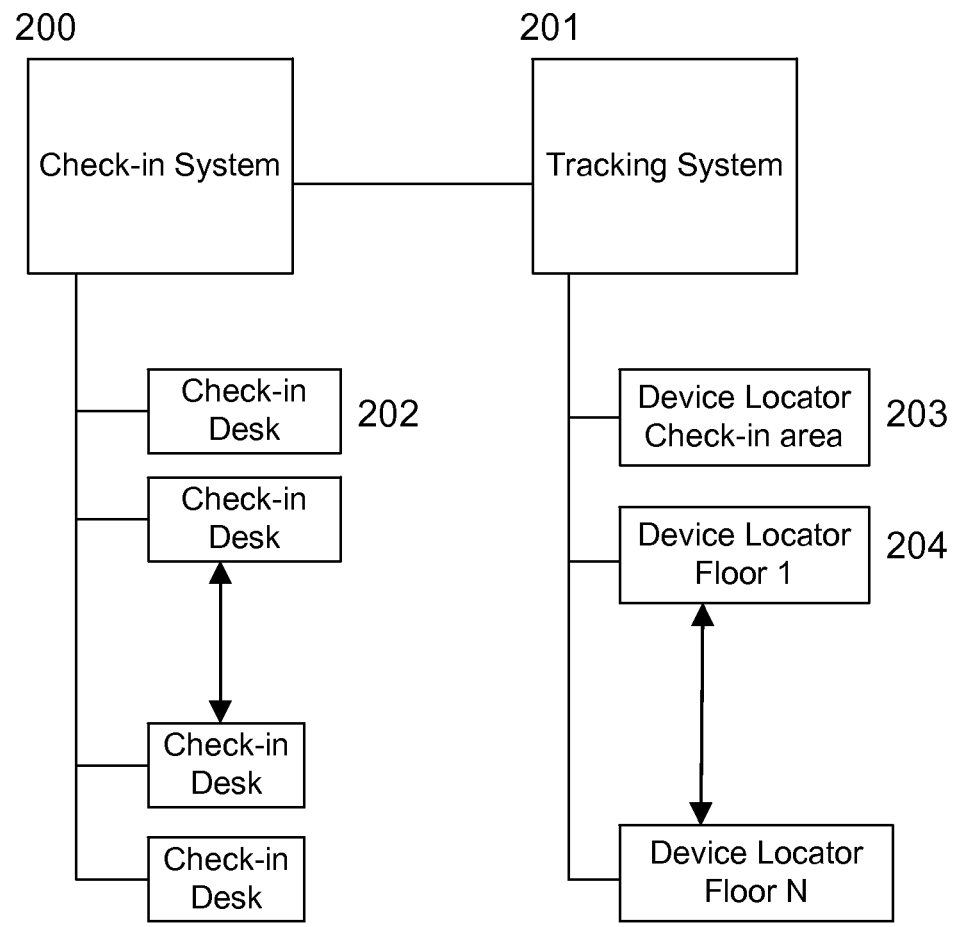
FIG. 2 is a block diagram of a check-in system and a tracking system according to an embodiment of the present invention.

Referring to FIGS. 1 and 2, when a customer arrives into a hotel they typically check-in 102, where any devices 106 they carry will be approximately located by the tracking system 201, and the customer identified as they provide their identification to the check-in staff, for example at a check-in desk 202, and hence the tracking system 201. At this point there may be multiple devices 107 within the area that can be resolved 108 by the electronic device tracking system 101, 201, and it cannot determine which device (103 or 107) is carried by the person checking in. In the event that the check-in area 203 is not busy, it may be that there is only one customer and one new electronic device present, the system will associate the device with the customer.

In the preferred implementation, hotel rooms are assigned in such a way as to increase the likelihood that customers and their electronic device can be associated. Customers who check-in at approximately the same time are assigned rooms that will cause them and their electronic devices to move apart to a distance sufficient to locate the devices separately.

In an alternate implementation of the invention the trackable electronic device is associated with the person carrying it, but not with any biometric identification or biometric tracking. Sensing the device provides the system with the identity of the player (to some probability or confidence), and the location to the extent resolvable by the type of device and accuracy of the tracking system. The limitations of this information and hence its applications in the various aspects of this invention are clear, hence the preferred embodiments mainly discuss tracking combined with other means of sensing. It may be used, for example, to select games for groups of players in an area, but it the players position cannot be determined accurately it cannot be used to select the game for the player at the gaming machine which he is standing next to—it does not know where he is to sufficient accuracy.

The exact location of sensors and assignment of rooms will depend on the sensing technology used. BLUETOOTH®, for example, has a limited range and a resolution of 2-3 meters that requires multiple sensors to cover the hotel area and will probably not be sensed through floors and ceilings, hence suitable locations would be on different floors of the hotel, and customers checking in at the same time will be assigned rooms on different floors. In alternative example embodiments, the sensors may be placed in the corridors outside the rooms to determine which room the device enters, and rooms assigned such that their doors are at least 2-3 meters apart. In alternative example embodiments, sensors are placed in corridors and customers are assigned rooms in different corridors.

Cell phones are likely to be sensed from outside the hotel, but might not be locatable by altitude, in which case rooms would be assigned with a significant horizontal distance between them. With a resolution of 50 meters, rooms would be assigned at least 50 meters apart.

Further, the time of the guest entering or leaving the electronically resolvable area is used help determine the association. For example, when the guest has finished at the check-in they normally leave the check-in desk 202 (to go to their rooms). The tracking system 201 interfaces to the check-in system 200 and records the time at which the check-in is complete. As such, any electronic devices leaving the area shortly after have an increased probability of being associated with the customer, and devices that remain have a reduced probability of being associated with the customer.

The association of each device with a customer increases the ability to associate other devices and customer. For example, if there were 3 devices and 3 customers checking in at the same time and each of the 3 was tracked to different areas it provides confirmation and hence increases the probability that each of the others is correctly associated.

There will be occasions where it is not possible to associate the electronic device and customer at check-in, such as when a husband and wife or entire family check in together. In this case a group of devices may be associated with a group of people until they can be separately associated as can be expected to occur by chance at some time.

However other opportunities exist to associate devices with customers (and capture reference biometric data), such as when making purchase with a credit card in a shop, where the identity can be determined from the credit card and electronic devices at that location can be scanned. The gender of the customer can be determined if the restrooms are separately resolvable, and at that point the husband and wife in the example can be separately associated with their devices. Another example is redemption of comps, where the identity of the customer is known when they use their player card. Yet another example is when the customer uses a player tracking card at a gaming machine, where the identity of the cards owner and hence probably the customer using it is known, and the location is also known.

It is illegal for children to gamble. In some cases children are not permitted on the gaming floor and in others children are permitted to pass through the gaming floor, but not to stay. When children are detected by the player tracking system and in violation of the rules appropriate to that casino, staff are notified by the system to take appropriate action. Conversely, detection of devices that stay on the gaming floor or just pass through, or even avoiding the area entirely, provides an indication that the device may be carried by an adult or child.

Preferably all staff 109 and their electronic devices 110 are entered into the tracking system enabling them to be removed from consideration when associating customers. Further, staff can be asked to provide a more accurate identification of their devices, which might be inconvenient and hence unacceptable for customers. For example, a BLUETOOTH® device could be placed in a shielded box with a sensor inside, so that only that device can be sensed, and the owner of that device can be directly associated with the device. Customers can of course in principle be asked to associate their devices, and where feasible this would be desirable as it is more accurate and may be lower cost.

It is also possible that the customer identity can be determined directly from the electronic device. For example, in some cases the phone company knows the identity of the owner a cell phone and may provide the location service as well.

Improving Biometric Identification and Tracking

It is an advantage of the invention that the accuracy of biometric player tracking and/or identification is improved by mathematically correlating the biometric identification and/or tracking of players with the identification and location of electronic devices they carry or the use of player tracking cards.

Alternately, accuracy of biometric identification systems, including facial recognition, may be improved if as many people as possible can be excluded from the set of people that are examined for possible matches against the sensed customer. By reducing the possible data set people who look similar and could result in an erroneous match can be eliminated, and the computation power required is reduced, potentially reducing cost and improving speed of identification. People can be removed from consideration by:

1. Detecting the location of electronic devices carried, and excluding people who could not possibly be in that area under scrutiny.
2. Using check-in/check-out data from the hotel reservation system to include and exclude people as they arrive and depart the hotel.
3. In some cases hotel room occupation can be detected, typically done for energy saving while the room is unoccupied. When there is only one occupant of the room then their presence in the room can be used to include and exclude them from the data set to be searched.
4. Players using the player tracking cards can be removed from the set of people being searched, as their location and identity is known.

Other measurements that may be used to improve accuracy of tracking players include color of hair and clothing, infrared imaging, movement through the casino (i.e., tracking as they move from one moment to another), speed of movement (i.e., old people are likely to move slower than younger people), and the groups of people they are detected with (e.g., a family is likely to associate with each other).

In one aspect of the present invention a method of tracking and/or identifying persons within a casino uses a tracking system. The method includes the steps of sensing a biometric characteristic of one of the persons using the tracking system, sensing one or more electronic devices, using the tracking system, within the vicinity of the one of the persons, and correlating the sensed biometric characteristic of the tracked person and the sensed electronic devices and identifying the tracked person as a function of the sensed biometric characteristic and the sensed electronic devices.

In one embodiment, the method includes the step of analysing the biometric characteristic of the one of the persons and identifying a potential sub-group of the persons to which the one of the persons belongs. Additionally, the method may exclude persons from the sub-group as a function of the sensed electronic devices. For example, the method may include the step of detecting a location of other electronic devices in other locations within the casino and excluding an associated person with each of the other electronic devices from the sub-group.

In another aspect of the present invention, the biometric and device tracking sub-systems are more likely to give a probable identity to each player rather than definitively include or exclude them from a set. In one embodiment, the method establishes or assigns a biometric probability of a match with each person in the database records as a function of the sensed biometric and assigns or establishes an electronic device probability of a match with each person in the database records as a function of the sensed electronic devices.

These separate identifications/probabilities from the subsystems are combined using mathematical correlation to improve upon the accuracy of either one by itself. For example, the biometrics may identify a person as being a particular player with a 50% probability, and another player with 40% probability, but the device tracking system identifies the probabilities as 10% and 90% respectively. Combining these we can see that it's far more likely to be the second player, not the first:

| | |
|---|---|
| 0.50 | 0.10 = 0.05, |
| 0.51 | 0.40 * 0.90 = 0.36 |

Since 0.36 is much greater than 0.05 it is more likely to be the second player

RFID

An alternate way to locate and identify people on the gaming floor is to provide them with an electronic device that is sensed remotely, such as an RFID tag. An RFID tag may be used in place of the traditional magnetic card or smartcard used to implement the traditional player tracking system, but has the added advantage of being remotely sensed. The players identity is known when they receive the cards at check-in and the player identity and the RFID tag are associated in the tracking system so that the customer can be identified from the RFID tag.

An advantage of the RFID card is that it avoids the necessity of associating the electronic device with the customer, may have a better locatable resolution than any other electronic device the customer is carrying, and all customers may carry it—some customers may not be carrying BLUETOOTH® enabled devices or cell phones. However for the purposes of this invention it is used by the casino for the same purposes and in the same way as the customer provided electronic device.

Preferably the hotel issues all customers are the hotel a unique RFID card that they will carry with them at all times, and it is therefore an advantage if the RFID card is used for other purposes such as hotel room entry, or to open lockers at the swimming pool, or to purchase games or food. Preferably children also carry cards so that they may tracked and prevented from gaming or located for parents in the event that they get lost.

A disadvantage of a RFID tag is that because it can be sensed from a distance it can be difficult to determine if it is used by the correct player—i.e., the player at the gaming machine rather than one person standing behind him. Furthermore, RFID is susceptible to some types of security attack. Hence, in an alternate implementation the RFID device is integrated into an otherwise traditional player tracking card with magnetic stripe or smartcard which is read by the magnetic card or smart card reader in the gaming machine, the RFID function being used to identify and track the person and used to implement features that do not required a very high degree of confidence, and the magnetic stripe or smart card used when a high degree of confidence is required or the RFID based identification is incorrect. When the identification is provided using the RFID based tracking rather than inserting the card, the players name or a player pseudonym may be displayed on the gaming machine or player tracking interface to show the player that they have been identified correctly.

For example, the RFID provided identification may be used to credit points to a players account as they play a gaming machine, without requiring them to insert the card into the gaming machine. The players name appears on the display of the player tracking interface showing them that their points are being allocated to their account. If another players name were to appear they can insert their card into the gaming machine, to ensure that the correct identification is made and that the point are allocated to their account.

Assignment of Player to Poker Tables and Detection of possible Collusion

Another aspect of the invention is a method to detect groups of players and in games where these is the potential for collusion between players to assign seating such that the possibility of players collusion is reduced.

Traditionally in some games, such as poker, where there are groups of players it is possible for players to cheat by colluding. In poker when there is more than one table required to seat all the players, they are assigned seats at random.

In the preferred implementation the location of all people within the casino is tracked, and the correlation between all people in the casino is calculated to determine people who are close to each other for a statistically significant time and hence likely to know each other. Preferably when a poker tournament is held the seat assignments are calculated, as far as possible, to assign people who are likely to know each other to separate tables, hence minimizing the possibility of collusion. Preferably the seat assignment is still random, and layers are separated in such a way that it is not possible to predict the table at which any of the players will be seated, nor to predict any groupings of players, to reduce the possibility of collusion by attempting to force the otherwise random seat assignment into a particular configuration.

Tracking of players may use the new methods disclosed in this invention or a traditional player tracking system.

Another aspect of the invention is a method to detect groups of players or players and casino staff and in games where there is the potential for collusion between players to advise casino staff of the possibility they may be colluding.

Depending in the number of players, tables, and people in the correlated groups it may not be possible to separate players. Furthermore it is possible that players and staff may collude to cheat.

In the preferred implementation the statistically significant grouping of people within the casino as disclosed above is reported to the casino staff supervising the tournament, so that they are away of a high risk of collusion and may be more alert. In the event that a staff member, especially one associated with the tournament, is detected as one of a group with the poker players then a different member of staff will be notified. The other member of staff will preferably be one unconnected with the poker tournament and at a high level of responsibility within the casino.

Demographic Identification

Another aspect of the invention is a gaming system that detects the demographic information about players and modifies the behavior of the gaming machine the player is playing, or the gaming machine closest to them in response to their detected demographic. The behavior of multiple gaming machines may be modified in response to the detected demographic of multiple people near the multiple gaming machines. Systems are available which are able to identify people by various demographics, including, for example, gender (male/female) detection from facial recognition systems or gait analysis from video images. While accuracy is desirable it is not necessary—the system need only be better than random to be useful. The players demographic may also be determined if they use the player tracking cards where their demographic (e.g., gender) may be recorded by and retrieved from the player tracking system. Gender may also be determined by tracking customers' use of restrooms.

Player Detected Approaching a Previously Played Gaming Machine

Another aspect of the invention is to change the behavior of a gaming machine or group of gaming machines according to gaming preferences of one or more players approaching the gaming machine they previously played, the preferences being determined from the player's gaming history and preferences stored on the player tracking system, or from the statistical preferences of the players demographic.

If the player is approaching a gaming machine at which they played previously it is likely that they are looking for that gaming machine and expect to play the same game. Therefore as the player is detected approaching a gaming machine where they played previously and that gaming machine is available, then the system selects and displays that previous game as the attract mode or current game on that gaming machine, and optionally initiates the loading of that game into main memory to eliminate or reduce the delay that the player would perceive if they selected that game for play. If the gaming machine is not available for play, then one or more of the nearest gaming machines that are available for play are selected instead. Preferably the location of alternate gaming machines is selected so that the player is likely to find them. Therefore gaming machines are prioritized for selection according to their availability, their distance from the previous machine, their visibility by a player standing at the previous machine, and their visibility by the player as they approach the previous gaming machine.

Figure 4:
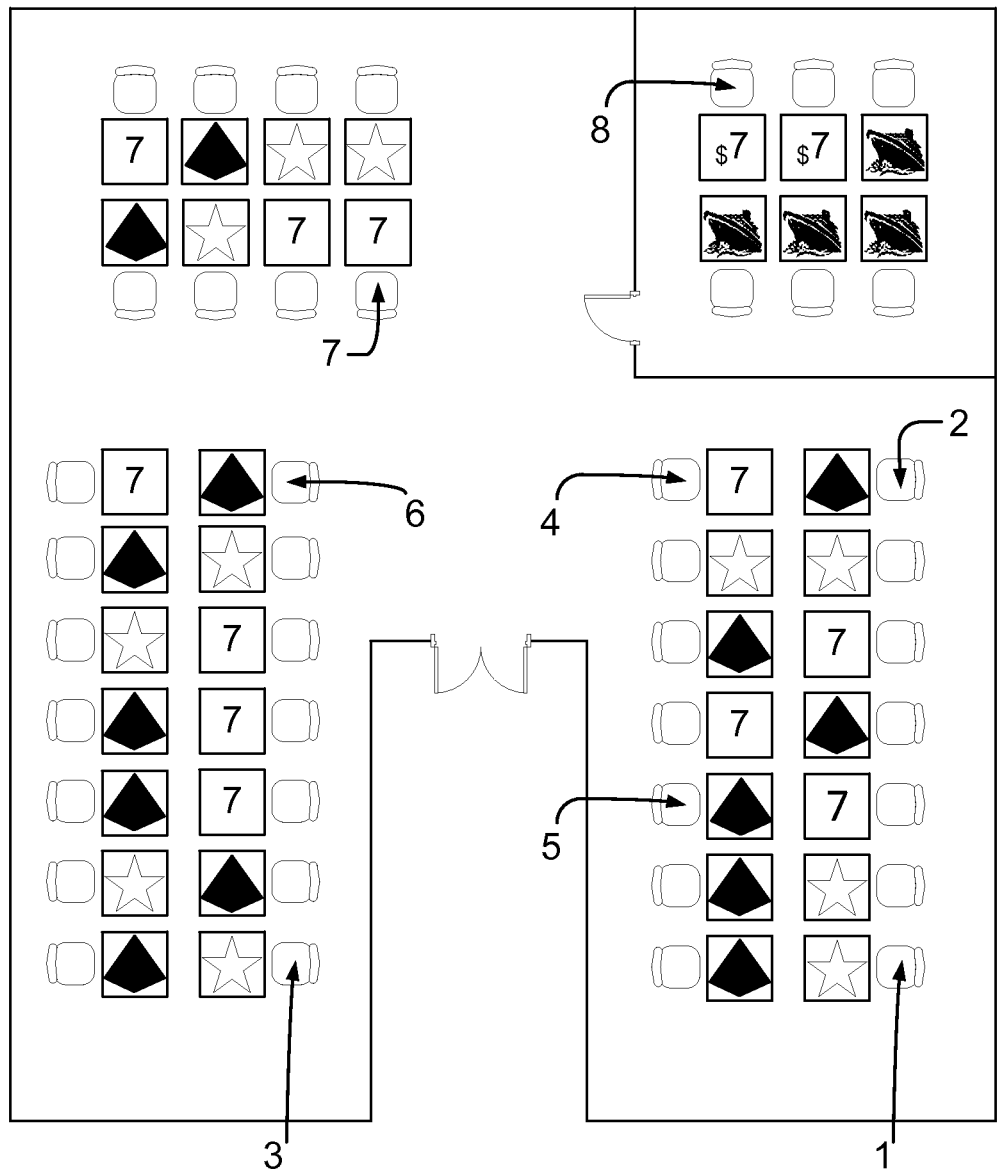
FIG. 4 is a diagrammatic illustration of exemplary gaming machine installation.

An example layout of an installation of gaming machines is shown in FIG. 4. The physical arrangement data stored on the system could consist of (x, y) co-ordinate pairs for each gaming machine, along with areas designated as "walls". Software stored on the system or on another system could interpret this data to produce lists of which gaming machine are near to the previous particular gaming machine. This software would take into account the presence of walls, or the fact that a player cannot see the gaming machines on the other side of a double bank of gaming machines. Some examples using FIG. 4 will make this clear.

A player sat at the seat indicated by (1) would only be possibly able to see the gaming machines to his right, i.e., all of the gaming machines between (1) and (2). He cannot see gaming machines (4) or (5) because they are obstructed by the gaming machines between him and them in the double bank.

A player sat at the seat indicated by (3) may be able to see the gaming machines between (3) and (6) and possibly the gaming machine at (7).

A player sat at the seat indicated by (4) may be able to see the gaming machine between (4) and (5) and the gaming machines at (6) and (7).

Preferably the last game is considered as the last game they played for a significant number of gambles or on which they won a significant prize. If a player had gambled for 8 hours on a first game, then played only one game (typically about 3 seconds on a slot machine) of a second game then stopped playing it is likely they remember and are looking for the first game, not the second. However if they won a large prize on a gaming machine and then stopped play, it is likely that they are looking for the game on which they won that prize, irrespective of how long they had been playing the game. The exact levels of play and prizes that are considered significant are configurable, and may depend on the players gaming history.

Where there is more than one game that is likely to be considered as the last game, if, for example, one game was played for a long play and another for a short time but had a large win, then one game may be selected as the attract mode game on the previous gaming machine and the other game selected as the attract mode game on a nearby gaming machine.

Preferably the probability of the player approaching the gaming machine is determined and used to determine if the game should be selected against other potential choices of game that may be made. For example, if the player is 5 m away and walking towards the gaming machine it is more likely that they are approaching the gaming machine than a person 100 meters away and approaching the gaming machine. The probability may also take into account the other destinations the player may take, such as a restaurant or restrooms between the player and gaming machine. The probability may also take into account other information about the player's destination, such as a booking in the player's name at the current time at the restaurant between the player in gaming machine. The probability may also take into account patterns in the players gaming history, where, for example, they may have played the same machine every day at approximately the same time for the last 3 days, then they are likely to want to play that same machine at approximately the same time on the next day, and probably not want to play any other gaming machine.

It is also advantageous to offer the potential player alternate choices of games which they may like, in the event that they are not looking for the previous gaming machine, cannot find it, or if they can be interested in playing something else. These games are selected, given the players probable identity and that identities recorded play history, from the games that might be expected to interest that player. These include games that the player had previously played, with the more recent and/or more highly played games being ranked higher. They may also include games selected from those that other players with similar interests liked, as described in U.S. Patent Application Publication No. 20070054738. See also the provisional application made by the inventors of this application and filed on the same date as this application, titled "Enhanced Method of Presenting Multiple Casino Video Games" for methods of selecting games for presentation to players.

Where there are multiple potential players in an area then there are multiple gaming machines each of them may be approaching, and the ideal selection of attract mode games for each of the players will conflict with that of other players, which is clearly illustrated if two players were detected approaching the same gaming machine and they had played different games.

In the event that more than one player is approaching the same gaming machine and different games must be displayed, or that the players are approaching different gaming machines but the nearby machine for each player that is used to present alternate game choices for each player is the same gaming machine, then the choice of game for a given gaming machine is prioritized according several possible factors, including.

1. The relative value of the players to the casino as determined from their player tracking accounts, such that game preferred by the more valued player is chosen in preference to the less valued.
2. The probability that the player is approaching the gaming machine, with a lower probability reducing the likelihood of their game being selected.
3. The probability of the player being correctly identified by the system, with a lower probability reducing the likelihood of their game being selected.

Where multiple potential identities have been determined for a player the priority of a probability of the game being selected according to each possible identity is proportional to the probability of that identity being correct.

In the event that multiple players are approaching the same gaming machine and the same game would be selected for each, then that game is selected on that gaming machine (it is not in play), and on as many other gaming machines as there are players approaching, with the gaming machines being selected so that each player is individually most likely to find them.

Preventing Game Change When Player is Close to Gaming Machine

Another aspect of the invention is to detect when a player is close and/or approaching the gaming machine and prevent the current game and/or attract mode game changing to another game.

Games may change on a multigame gaming machine for a number of reasons, including the casino downloading new games, the games automatically cycling through the games available to promote them and as outlined in another aspect of this invention because players are detected approaching the gaming machine that they previously played.

If a player sees a game displayed on the gaming machine and decides to play that game it would be unfortunate if the game changed before they had a chance to play it. It is disturbing to the player when games change for no apparent reason, and they may have been attracted by the game they saw but not interested in the new game.

Preferably the player tracking system detects one or more players close to the gaming machine and prevents the game changing to another. Preferably the tracking system discriminates between the player standing close to the gaming machine and players approaching to sit at the gaming machine—when the casino is crowded there will usually be players relatively close to the game machine, but not necessarily intending to play. Preferably when the system is able to distinguish which direction the player is looking it only prevent games changing on gaming machines in that direction.

If the system implements both this aspect of the invention and that of changing the game when a player is detected approaching a previously played gaming machine, it is important to determine a point at or before which the game will be permitted to change and after which it will not. For example, the game may be permitted to change when the approaching player cannot see it, as may occur if other gaming machine are between the player and the gaming machine, or if the player if too far away. The game change to the previous game should therefore occur before the player gets too close, the exact meaning of which will depend on the layout of the casino floor, and a distance of, for example 5 meters, beyond which even though the player can see the gaming machine they will not be paying close attention it.

In another aspect of the invention player tracking system detects players actually sitting at the gaming machine and prevents games changing. This may be implemented when the tracking system described elsewhere or a sensor in the gaming machine is able to detect a player directly in front of it at a short distance away, a sensor in the seat or floor, or any other technique that achieves the same end.

In another aspect of the invention the player tracking system, which may be a traditional player tracking system, detects the player has inserted their player tracking card, and prevents the current game and/or attract mode game from changing.

Pre Loading Games

In another aspect of the invention the gaming machine preloads into main memory the next game or games most likely to be played.

Due to technological limitations when changing games on a gaming machine there is usually a delay while the game loads into main memory from secondary storage or from across a network. The gaming machine may be able to load only one game at a time into memory or multiple games, but in any event it is unlikely to be able to load all games available.

Therefore it is advantageous to determine which games are most likely to be selected next and start loading them before the player selects them, so that the player perceives minimal or no delay.

Where multiple games may be loaded into main memory then games are loaded into memory in order of probability of their being the next game selected, such that the most likely game to be played is loaded first, and least likely loaded last.

When there is no player at the gaming machine the next game is most likely to be the current attract mode game, and this should start loading when the attract mode game is displayed. When no other information is available about the next player then the next most likely game to be played are those games that are most popular in the casino.

When there is no player at the gaming machine, but there are players close to the gaming machine who can be identified, the next most likely game is the games that these players had previously played, each with a probability of being selected based on the distance between the player and gaming machine, such that players further away have less influence than players close to the gaming machine.

When there is no player at the gaming machine, nor are there players close to the gaming machine who can be identified, but there are players close to the gaming machine whose demographic can be identified, then the next most likely game to be played is the game preferred by that demographics statistical preferences.

When a player is detected approaching a previously played gaming machine, the next game most likely played is the previous game that that player played, and this game should be loaded. As described for that aspect of the invention there may be multiple possible games that have a significant probability the player will play them, and if it possible each of these games should be loaded.

When a player inserts a player tracking card into a traditional player tracking system the most likely next game is determined from the players gaming history, and is their most recently played game. When the player has recently played other games these should also, if possible, be loaded in order of their popularity and time since last play.

When the player is selecting another game to play one or more game selection menus are displayed. The game most likely to be selected will be one of these games, or a game on the next selection screen if there is one, as it is not possible to select any other game. However the probability of each game on the menu being the next game may not be in the same order in which the games are presented to the player, as the selection screen may have a different criteria determining the order. In particular the casino may wish to promote certain games or to offer game that the player is likely to enjoy, but the player is still likely to select their favorite game.

As each game is selected for play, the next most likely game to be played may change, as the actual selected game will no longer be considered a possibility for the next game.

Attract Mode of Gaming Machine Selected According to Players in the Area

Another aspect of the invention is to change the behavior of a gaming machine or group of gaming machines according to gaming preferences of one or more players close to the gaming machine, the preferences being determined from the players gaming history and preferences stored on the player tracking system, or from the preferences of the players demographic.

A player is more likely to start and then continue playing a gaming machine if they see a game they like. It is therefore an object of the invention to promote games to a player via the attract mode of the gaming machine, the attract game being selected to appeal to the player.

Player Selection of Game at a Multigame Electronic Gaming Machine (EGM)

In the example demographic of gender, some games appeal more to men and others appeal more to women. Preferably attract mode games of the gaming machine are selected from those games that are more likely to appeal to the gender of the person closest to the gaming machine. Alternately in the event that a number of people are close to number of gaming machines the number of gaming machines that display attract mode games preferable to each gender is in proportion to the number of each gender detected nearby. Nearby means that the gaming is physically close to the player and that the player can see the game it displays—if the gaming machine display faces away from the player then even though it may be physically close the player cannot see it and it is not considered nearby. Preferably the system is configured with the location and visibility information for each gaming machine in the casino, so that it can determine if each detected player can see the gaming machine. For example, if a group of 5 people comprised of 1 male and 4 female are nearby a bank of 5 gaming machine, then 4 of the gaming machines would show games preferred by women and one would show games preferred by men. When the detection system is able to detect which way the person is facing or looking, as can be done with facial recognition technology, this additional information is used to refine the visibility of gaming machines and nearness.

A previously described multigame gaming machine have selection menu from which the player selects the next game to play, but it can be difficult for the player to select a game they will like from the available games. When the players gender is known the games available in the selection menu are automatically prioritized to include more games that appeal to that gender. In general the selection of games in the menu is based on the popularity of the game according to demographic, and accuracy of the demographic identification. For example, if the games were very strongly preferred by one gender only and the classification accuracy is only slightly better than random (say 51%), then it would not be appropriate to select all of the games on the menu accordingly as mistakes in the classification would make a game menu strongly disliked by the other gender (49%).

When a player at a gaming machine wants to change to another game, they use a game selection menu to select the next game. Where the number of games available exceeds the number that may be shown on the game selection menu at any one time it is important to present those games most likely to interest the player as early as possible in the selection process so that the player can find them as quickly as possible to enhance the gaming experience and to avoid them losing interest. It is also important that even if they select a game which they have not played before that they enjoy it.

Preferably the probable identity or demographic of the player is used to influence the order in which games are presented for selection by the player.

For example, if the game selection menu can display 10 games at a time then these games are selected based on the probable identity of the player, and the selection of games may be split according to multiple possible players. For example, if there is a 50% probability of the player being Bob, 30% James, and 20% Jill, then 5 of the 10 games are selected according to their likelihood of being liked by Bob, 3 selected according to James, and 2 selected according to Jill.

In another example, the system determines a probability of 70% that the player at the gaming machine is male and 30% chance that the player is female, resulting in a selection of 7 games that appeal to males, and 3 games that appeal to females.

It should be understood that demographic preferences are statistical preferences and not guaranteed to be correct, and each game will have a different percentage of each demographic it will appeal to. It is very unlikely that a game will appeal to 100% of one gender and 0% of the other, and that many game will appeal equally to both. Preferably the choice of games for the selection menu therefore takes into account the probability of the demographic being correctly identified and the success of the game with that demographic and the success of the game with someone not of that demographic. For example, a score may be calculated for each game, where there score is probability of the demographic detected being correct, multiplied by the success of the game with that demographic, and games ranked for presentation according to score, with higher scoring games being presented before lower scoring games.

The casino may choose to reserve some of the games choices on the selection menu to promote new games, or simply to show the most popular games within the casino at the moment. For example, 5 of the 10 game selection spots may be reserved for these purposes and the other 5 chosen based on the probable player(s).

When a player has played a game for a short time then changed to another game it indicates that they did not like the game, and this game should in future be prioritized down, so that other games are more likely to be selected. In an improvement to U.S. Patent Application Publication No. 20070054738, this indication of disliked games is input to the recommendation engine to further refine the selection of games the player may like.

Partitioning the Gaming Floor

Casino floors are partitioned into separate areas, most visibly special areas for high rollers.

Another aspect of this invention is to detect and create social groups on the gaming floor, enhancing the players enjoyment of their visit as they have an increased chance of meeting people they enjoy socializing with. Another advantage is to increase the effectiveness of the attract mode of gaming machines when the game appeals to a particular demographic and there is a high proportion of that demographic in the area. Similarly advertising to groups of people is more effective when targeting the same demographic.

The demographic mix of people within the casino changes over time, as does their location. Player demographics can be determined from a traditional player tracking system, given the players identity and the data stored in the database about them, or player demographics may be obtained from the tracking system described in this invention. The player tracking system and/or demographic identification system is used to detect player's location and demographic within the casino and knowing their play history and other player information (such as age and gender, etc.) can detect concentrations of similar people within the casino.

One application of detecting groups of people is that it allows casino staff to detect how well player respond to the physical casino design which is intended to appeal to different groups. Another application is to allow the measurement and hence optimization of changes in the casino environment. For example, the music may be changed in an area and the casino staff can determine in detail the players' response to the change, not just in that area but within the entire casino.

In response to groupings detected in the casino, various physical effects may be modified to make an area more or less interesting to one demographic or another, subtly causing people to move from less appealing to more appealing areas, where there will meet more people of similar to themselves, and hence are more likely to enjoy themselves.

For example, the system may detect a concentration of younger people in one area of the casino and older people in another. Either manually or automatically the lighting and music in both areas is adjusted in response, for example with brighter lighting and Frank Sinatra playing in the older person's area and Pop music and darker lighting in the younger person's area.

Comps

The anonymous player tracking system may determine to some probability how much a player not using a player tracking card has gambled and how much comps it should offer them, and also if it can try to get them to use a player tracking card. The comps offered will be similar to that offered to a player with a card, adjusted for the probability of their being (or not) the player that was tracked. For example, if the player is known with 100% confidence they may be offered $100 based on their play, but if the same player is known with only 60% confidence they may be offered $60 (i.e., $100*60%). In this case the actual identity of the player is not important, and it is only required that the player history be tracked.

The offer of a card may be used to identify players—i.e., $60 of comps may persuade someone to sign up for the card and be identified.

The anonymous player tracking system needs to determine a probability of the player being identified and/or tracked correctly. This probability may change over time—there are times when the probability will be high, such as when they have just paid for something using a credit card from which their name is captured and communicated to the tracking system, and other times it will be low if they exit the tracked are (i.e., leave the casino and enter an untracked area such as a restroom) and return. The system also tracks players through the casino without knowing who they are, monitors game play of that player, and determines a probability of the game play having been performed by the tracked person. Preferably, each gamble is assigned a probability independently.

A player may forget to use their card and request that their play history be credited to their account. Traditionally this might be possible through viewing security video recordings, but this would be impractically expensive. With the anonymous player tracking system the player can identify themselves by inserting their card and the system can quickly determine their likely play history and award them accordingly. The system may calculate their award based on a threshold probability above which they are determined to have made each gamble, or in proportion to the probability of their having made the gamble, or both.

To deter cheating of the computerized system by a similar looking person, staff may at random review the identification. The system may also use human auditing of the play history, by creating an easily viewable presentation of the sensor data (e.g., camera in the casino) allowing staff to quickly approve or not each element of the players gaming history.

In Casino Advertising to Players

Another aspect of the invention is an advertising system for the optimization of advertising presented to players based on the data from the player tracking system about those players. An advantage to this aspect of the invention is to reduce the workload of the casino staff and improve the quality of the advertising campaign. As the calculation of the optimal offers gets more complex it requires more skilled staff to perform it, and the possibility of sub-optimal advertising increases.

Figure 3:
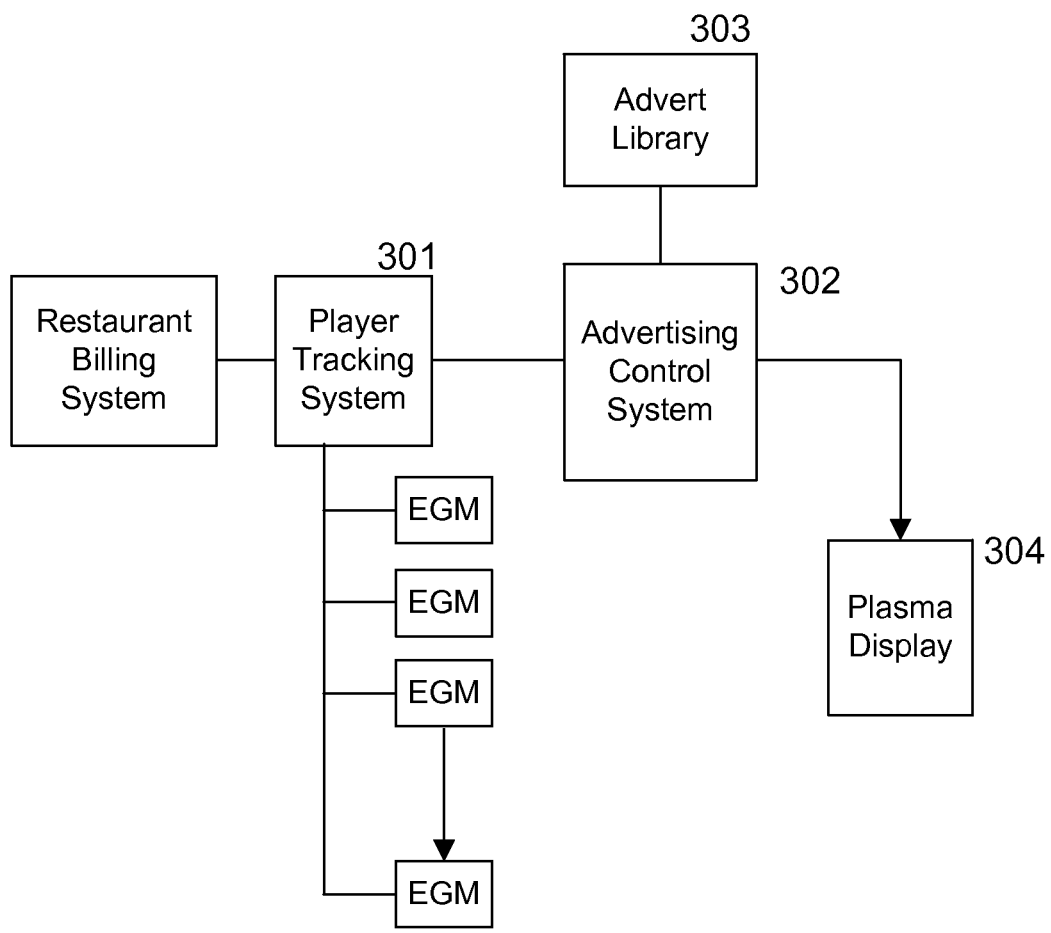
FIG. 3 is a block diagram of an advertising control system, according to an embodiment of the present inventor.

Referring to FIG. 3, gaming statistics collected by the player tracking system 301 provide information about a group of players that is used by an advertising control system 302 to optimize the selection of adverts from a library of adverts 303 for presentation to those players using, for example, a plasma display 304. In the case where a number of advertisements are presented in a series, as opposed to selecting only one advertisement for a longer period of time, the system determines the selection of advertisements in the series and, where applicable, the proportion of time each for which each advertisement will be shown according to the grouped player statistics.

In the preferred implementation, each advert in the advertising system has an associated parameter table specifying the suitability of the advert to a predefined target audience.

The operator specifies the advertising campaign by specifying a weighting to show the importance of each target audience. A score is calculated for each advert by multiplying the operator specified weighting for each target audience and suitability of the advert for that audience, and summing the result for each target audience. The scores for each advert are ranked to determine the most suitable advert or adverts according for the campaign. Further the operator weightings may be dynamic, such that they are dependent on measured statistics from the casino, such as the number of people using player tracking cards, detected demographics, etc., allowing the advertising to be modified in response to changes in the casino or players. Alternate methods of determining the optimal selection of adverts are of course possible.

The advertising system interfaces to the player tracking system 301 to retrieved statistics for players and hence determine the best advert(s) to display according to the target audience. Target audiences might include the advertisements age group(s), gender, membership status of the players club (e.g., are they a member and have a player tracking card, do they have a lot or points or not), are they staying in the Casino hotel and if so how many more night are they staying, etc.

For example, the player tracking system measures the number of gaming machine that are being played by people not using player tracking cards, and the number of gaming machines being played by people using player tracking cards. When the proportion of people not using player tracking cards rises above the point specified in the rule for the advertisement, the advertisement is selected and typically it would promote the use of player tracking cards, for example and offer explaining the benefits of joining the players club.

In another example, when the anonymous player tracking system determines that there are many people in the gaming area who are probably not members of the player club (and hence do not have player tracking cards) in proportion to the number of people playing gaming machines and using player tracking cards then again advertising may be selected to promote the use player tracking cards.

In another example, the advertising system may determine that there are many people using player tracking cards and that many of them have enough points to buy a meal at the casino restaurant, which will cause adverts promoting the use of player club points for a meal at the Casino restaurants. Where the casino has multiple restaurants, the actual restaurant advertised may depend on the average number of points the players have.

A further aspect of this invention is to measure the response by players to the advertising and present this response to the casino operators to allow them to review and further optimize the selection of advertising. Preferably the advertising system determines for advertising campaign which adverts were shown to which players, and the response of each of those players to the advert.

In the previous example where points in the casino player club are used to buy restaurant meals the number of meals purchased with player accounts, and where the players were exposed to the advertisements while gaming and using their player card, is measured. This measurement may be compared to the same measurement on other occasions where the advertisement was shown, where it was not shown or where the details of the offer were varied (such as meal for 500 points, meal for 600 points, meal for 700 points, etc.). If there was a small response to the offer of a meal for 700 points the next day the offer may change to a meal for 500 points, and the day after it might be 600 points as the promotion is fine tuned.

In another example adverts are shown to players who are tracked with the anonymous player tracked system, where the system determines a probability that the customers who respond to the advertisements are the same players to who the advertisements were presented, and uses that probability to aid in the optimization of the advertising campaign. If the advertising campaign were for the casino restaurant and for each person who visits that restaurant that the anonymous tracking system determines a probability that they were shown the advert, to determine the average response by people who saw the advertisement. For example, if two people who each had a 75% probability of being people who were shown the advertisement, then the average response is 1.5 people.

A further aspect of the invention is for the system to optimize the advertising campaign automatically, reporting on the results as required. In an example embodiment of the invention the system would ask for operator approval before changing the campaign parameters. Using the previous example the operator would configure cost limits for the meal offer of between say 400 and 800 points and the system would vary the cost to the player according to the measured response to the cost. The operator would also configure which days are to be used as reference points to determine a change in performance, so instead of comparing consecutive days it might compare against the same day in the previous week. The system may also monitor other information available in the casino to help determine if the comparison is valid, such as the hotel occupancy rate. If there occupancy rate of the hotel is significantly different between the two advertising periods it is likely that a simple comparison of the response will not produce a useful result and that a more sophisticated statistical analysis is required. This type of analysis is well known.

Preferably the advertising system is configured to take other information into account to optimize the advertising, for example minimizing the cost of the offer by making offers on underutilized resources.

Using the previous example again, on certain days of the week the Casino restaurants will be relatively busy and on others they will be quiet. It would reduce cost to the casino to have as many people as possible use points on the quiet days rather than the busy days, and maximize the cash they take on busy days. The offer points cost is then adjusted to take into account the expected number of customers for each day of the offer if the offer were not taking place, but not increased past given limits which customer would find unreasonable.

The expected number of people using the restaurant may be predicted from historical data (e.g., how many people visited on the same day last week), or estimated based on the number of people who have booked rooms at the casino and/or already checked in, or by analyzing both together.

In another example, the casino may have a Magic show, which is normally busy Friday, booked out on Saturday nights, but not busy Monday to Thursday. The price in points of an offer players would be automatically adjusted to its most expensive on Saturday, lowest Monday to Thursday and in between on Friday. The exact cost for each day varies according to past measured cost and results.

The cost (or profit) to the casino of an advert to players can be estimated in advance by the number of people to which the advert is shown, where applicable the number eligible to accept the offer (for example player club membership), the predicted response by customers, and the cost of the offer per individual. An advantage of being able to rapidly change the offer is to be able to make short term offers (e.g., this evening only), and where there actual cost is higher than expected, rapidly change the offer.

Another aspect of the invention is to provide customized advertisements to each individual player, rather than groups of players. In this aspect the advertisements are shown on the gaming machine, preferably on the player tracking device or main screen of the gaming machine depending on the details of the system implementation. An offer shown on the gaming machine may be valid for that gaming machines player only. While the system operates in a general manner as described previously, the player statistics on which the advert is based are treated individually rather than as an aggregate, resulting in an advertising campaign optimized to each individual player.

A player using their player tracking card or identified with a high degree of certainty will have adverts and offers based on their play history and club points balance, number of days remaining at the hotel, pre-existing booking in the hotel restaurants or shows, etc., and is able to redeem any offers by presenting the card as identification.

For example, all offers and advertisements would be limited to those useable during the player's visit to the hotel/casino, as determined by the player's hotel records, known through the player tracking system. Offers to shows would not include shows the player had already seen or booked.

Players not using a card will have more generic offers, adjusted by the anonymous player tracking system ability to identify them. In the case that the system identifies them with high or 100% certainty the advertising and offer would be the same as if they had used a player tracking card, and may include a message stating that the offer is only valid for the named (identified) person, such that when errors in identification are made the offer is not valid. Preferably a player not using a player tracking card may accept an offer, by touching a button or the screen, etc., and the system will cause a receipt ticket to be printed for the player, which they present to redeem the offer. The ticket may use the same ticket mechanism as Ticket In Ticket Out (TITO) system, having a bar code with a unique computer readable identifying number, and human readable details of the offer and any applicable limitations (such as time limits). Players using player tracking cards may also be offered printed tickets, as they serve as a reminder to the player of the offer they accepted.

For example, the player may be offered a discount at the restaurant, if they press the appropriate accept button. On accepting a ticket is printed, and the player redeems the ticket at the restaurant. Preferably the system tracks the number of tickets printed and adjusts its offers to other customers such that the restaurant is not overbooked. Preferably, the players response in accepting and redeeming tickets is recorded and analyzed by the advertising system, and the resulting data used to optimize the advertising campaign.

Bids on Advertising and Game Selection

Another aspect of the invention is a method to select games for presentation to the players detected using the anonymous player tracking system and according to bids using the methods disclosed by the same inventors as the provisional patent application, in the previously referenced utility patent application, filed on the same day herewith, and with the title "Enhanced Method of Presenting Multiple Casino Video Games".

The utility patent application by the same inventors as the provisional patent application referenced above, filed on the same day, and with the title "Enhanced Method of Presenting Multiple Casino Video Games" discloses methods of selecting games for presentation to players based on bids. The same methods of bidding for the selection of games are applied to the selection of games presented to players detected with the anonymous player tracking system disclosed in this application.

Hence a bidding system is implemented where bids may be made to influence the selection of games presented games to players based on anonymous player identification at gaming machines, approaching gaming machines, by demographic, or in groups within an area of the casino.

For example, as a player approaches a previously played gaming machine, the gaming machine near that gaming machine display alternate games where the selection of alternate games is selected according to the methods disclosed in the other patent disclosure.

For example, a demographic group of players is detected by the anonymous player tracking system, and the selection of games near the group is selected according to the methods disclosed in the other patent disclosure.

For example, a player identified by the anonymous player tracking system stands near a gaming machine, and the game presented on that gaming machine, or the ones nearby, is selected according to the methods disclosed in the other patent disclosure.

Customer Service

Casino hosts offer highly valued players a very personalized service, making the players feel welcome and more likely to return in the future. While highly desirable, this level of service is expensive to offer and it would be advantageous to offer better service to more customers.

In another aspect of the invention is a relationship management system where interactions between hotel/casino staff and customers are recorded and made available to staff for later interactions, enabling staff to provide a more personalized service to customers.

Each interaction between a staff member and the customer is recorded and analysed. When the player tracking system detects and identifies a customer approaching a staff member the relationship management system summarizes the relevant information the staff member needs to know to provide develop a good relationship with the customer, the information depending on the staff members job function, previous interactions with that same customer, customer value to the business, and communicates it to the staff member. Where the customer approaches multiple staff members who may perform the same job function the system selects the best staff member to perform the job and provides them with the relevant information.

In the preferred implementation, customer's cars are detected as they approach the hotel/casino valet service area and the number plates are read by an automated number plate recognition system. If the car license plate is in the customer database the customer is identified from the recognized license plate number, and an optimal staff member is selected to attend to the customer. Alternately the customer is identified by the player tracking system which is another aspect of this invention. The optimal staff member is selected from a number of criteria, including those actually available to serve the customer, the staff member who previously served this customer, and any recorded negative or positive relationships between each staff member and customer. Rather than the customer being greeted and looked after by a random staff member they will likely meet the same staff member each time, giving staff the opportunity to build a relationship with customers. If the customer makes a complaint against any member of staff, the complaint is recorded in the relationship system and the system will attempt to find another staff member to serve that customer in the future, and similarly if the staff member indicates a bad relationship with the customer, the system will do the same. Conversely if the customer praises the staff member that fact can be entered into the system and the system will attempt to select that staff member in future interactions. Staff may further make notes into the system to record details they will find useful in future interaction—for example the customer may disclose names of family members and the staff member will want to ask about them in future interactions. Preferably, access to these notes is generally restricted to the staff member who made them, although of course hotel/casino management would be able to access them as required.

Preferably, as the identified car and customer approach the valet service the valet is advised of the approaching car, its license plate number, preferably make and color of the car, the name of the customer, and the relevant summary of their mutual previous interactions.

While it is possible for a system to include information about other staff members interaction with that customer, preferably the information revealed to the valet staff is based on the relationship between that staff member and customer, to protect privacy of customers and prevent staff being overly familiar with customers and making a bad impression. For example, a customer may visit who has visited many times before and the system records many details about the customer. However, the valet staff member servicing the customer has never met the customer before—it would generally be considered rude, if not disturbing, if the staff member greeted the customer in a very familiar manner knowing details of their previous visits, when the customer knows they have never meet before. In this case the system may reveal to the staff member some indication of the importance of the customer but little else. To a different staff member who has served the customer before system may report, or summarize those previous interactions.

The record of which staff member interacted with each customer may be determined using several methods, (1) the staff member may manually record the interaction into the system, (2) the tracking system may track both staff and customers to determine automatically who interacted, (3) the staff member may be the only staff performing that function in which case all interaction while they are on duty must have been with them.

In general all relationships between staff and customer can be recorded and optimized, including bar staff and gambling table staff Where the player can be automatically identified the system can report to staff members on their relationship. Preferably the player is identified, or at least identified to some probability before they actually meet the staff member, giving the staff time to review the information the system presents, to confirm or reject the identity presented and review the interaction history. For example, a player may use a player tracking card at a gaming table, hence identifying themselves to staff. However by this point the staff has already greeted the customer, and lost one opportunity to improve their relationship—although there are other opportunities during the course of the time when the player is at the table that can be aided by the recorded interaction history. When the system is able to recognize, or probably recognize the player before they reach the table, the table staff have an opportunity to make a more personalized greeting.

Preferably, the system presents the interaction history on a computer display, with details on each of the customers arranged on the display shown in an approximation their physical relationship between themselves and the staff member, and the physical layout of the area aiding rapid comprehension of the data by the staff member. The display for a table game would show the table and customers around and approaching the table. The details preferably include a photograph of the customer, gender, and approximate age, so that the staff member can confirm that the customer has been correctly recognized by the system. The staff member can indicate to the system that the customer has been incorrectly recognized, and the system may in response display the next most likely customer to be recognized. Preferably the customer details further include a summary of their relationship with the staff member.

Alternatively when the system determines with a significant probability multiple possible identities for a person, each of those identities maybe present to the staff member so that they can choose the correct one.

The system may record many details about the customer from their relationships with many casino staff in differing job roles. The information revealed to each staff member is also determined by the needs of that staff member to do their job, and to respect the customer's privacy. For example, the valet needs to identify the customer's car, but the bar tender does not, and the bar tender needs to know what the customer likes to drink, but the valet does not.

The tracking system may advise the staff servicing each area in the casino of the players detected within that area (using detected BLUETOOTH® devices for example), and in particular of the value of those players to the casino, enabling staff to provide a better service to players and to prioritize their efforts towards the higher value players. Preferably the system ranks presentation of identified players according to their value, and preferably includes a photo and other important details about the player. The casino staff are therefore better able to look after the players with less effort—they do not have to remember details about all the players in the casino, only all those close by. The same method can be applied to a traditional player tracking system, except that it is not possible to detect players unless and until they insert their cards into the gaming machine.

The customer's photo and other biometric identification data may be captured by the tracking system when the player is identified, preferably when checking into the hotel as they present their identification to staff, or when they use their player tracking card at a gaming machine. The gaming machine may incorporate a camera or a camera may be mounted externally and is directed to take a photo of the player in response to the player card being inserted.

Geographic Tracking

Another aspect of the invention is to detect an electronic device that a person is carrying, and when they enter a geographic area to offer a service or advertisement to that person.

Customers may be tracked over wider areas by tracking the electronic devices they carry, enabling the hotel/casino to provide services. While the same methods used within a hotel/casino could in principle be used to track customers over larger area's it is likely that technology limitations will prevent this being optimal for some time.

Rule Based Message Delivery

Another aspect of the invention is a message delivery system that comprises the detection of customers, advising advertisers of customers, accepting bids from said advertisers, evaluating bids, and transmitting messages from the one or more successful bidders to the customer.

Many casinos, such as those in Las Vegas, Nev., are located in tourist destinations with customers arriving by airplane or driving. In the preferred implementation a customer is detected at the airport, or on the road entering the destination as the drive, when their cell phone establishes contact with the local phone company cell phone transceiver base stations.

Their cell phone number is transmitted to the casinos/hotels subscribing to the messaging service, the casinos/hotels search their database to determine if the holder of that cell phone number has previously stayed at their hotel or visited the casino, and if so, determine a value to their business of that customer. This may include consulting player tracking records. They determine how much they are prepared to pay to send a message to that customer, and submits a bid to the message delivery service together with an appropriate message. The message delivery service after a suitable interval, or when bids have been received from all parties, selects one or more of the highest bids and sends those messages to the customer.

Further, the bid may be accompanied by delivery rules, which must be met for the bid to be successful. The rules may specify information which the casino may not possess, but the message delivery service does, such as the phone holders name or current credit record. In this way the casino/hotel may target their bids and messages more closely to their customers, and may potentially offer higher bids for the right customers.

In an alternate implementation, to avoid the need to disclose the customer's cell phone number to the hotel/casino, the hotel/casino advise the message delivery service of all the customers with which they have a business relationship with and who have agreed to have their approximate location disclosed. Only if an arriving customer is on the casino's list of numbers will the casino be advised of the number.

In an alternate implementation, to avoid the need to disclose the customer's cell phone number to the hotel/casino, the hotel/casino advise the message delivery service of all the customers with which they have a business relationship with and who have agreed to have their approximate location disclosed. Only if an arriving customer is on the casino's list of numbers will the casino be advised of the number.

In an alternate implementation, instead of, or in addition to, sending a message to the potential customer, a person at the airport is alerted to the arrival of the potential customer so that they may greet them. For example, a limousine service may be offered to take the customer to the casino, whereby the limousine service has drivers waiting to greet customers as they arrive, one of the available drivers receiving a message to greet the customer with the customer's name and optional photograph. The driver on receiving the arrival message writes the customer's name on his message board and holds it up for the customer to see. At the same time, the customer is sent the message of the limousine service and looks for their driver. As described elsewhere in this disclosure the customer may be send a message ID on the cell phone which they preset to the driver, or alternately they simply present identification to the driver.

Anonymous Rule Based Message Delivery

Another aspect of the invention is a message delivery system that receives a message together with rules specifying the conditions which must be met for the message to be delivered to anonymous recipient's receiving devices.

It is an advantage of the invention that the private information required to deliver the message need not be known by the company that originates the message.

In the preferred implementation the receiving device is a cell phone, and the message is delivered by a phone company implementing the message delivery service via SMS, and a business creates one or more messages for delivery to potential customers, and specifies the conditions under which a message will be delivered.

The phone company knows the approximate location of all subscribed cell phones, as each cell phone communicates with the telephone network via a base station transceiver. As the cell phone moves from one location to another the base transceiver to which it communicates changes to ensure reliable communications. More accurate location is also possible using known techniques, including triangulation from multiple base stations.

For example, a casino may create an offer of a discount meal at their restaurant, and specify the message is to be delivered to only cell phones detected at another casino next door, and only at a particular time of day. The originating casino may make offers based on the availability of seats in their restaurant as estimated from restaurant bookings, hotel bookings and historical usage.

Other rules for delivery are possible, including time of day, how long the cell phone has been a specified area, whether the cell phone had been or had not been in another area first, etc.

Rules may be created based on the data that the phone company collects about its customers. If, for example, the phone company recorded the gender of the cell phone holder, the business may create different advertisements for male and female customers, and specify that each message is to be delivered to a particular gender only. This principal may in general be applied to other data, including billing address, direction of travel as detected by the cell phones recent movements, owner's credit records, residential address, cell phone usage, etc.

An advantage of the system is that advertising offers may be valid for a short time only, giving a sense of immediacy to adverts and limiting the company's liability for poorly planned offers, and quick measurement of the response to advertising and improvement of the next series of advertising.

In other embodiments, the originator of the message may be advised of delivery of the message.

In other embodiments, the message delivered to each recipient is customized to include a unique code created by the phone company to identify the message, the unique code being also sent by the phone company to the business originating the message when the message is delivered. When the recipient redeems an offer the unique code is read from the phone either by reading a human readable number from the phone, or scanning the number from a bar code, allowing the originating business to track the response to the advertisement. This further allows the originating business to track performance of multiple phone companies delivering messages to customers as the unique code will identify which phone company delivered the message that was redeemed.

When an offer is redeemed, a redemption message may be sent to the phone company together with the unique ID. The phone company stores this response data for each cell phone holder, where it may be used in future rule base messages with rules specifying a customer's response to previous messages. For example, a message may be sent only to those people who had responded to previous messages. Further, the type of offer to which the recipient responded may additionally be stored, allowing, for example, a message to be sent only to people who had previously responded to offers for particular products.

In another aspect of the invention messages may be sent to a specific cell phone numbers with delivery rules specified.

In an example of the invention a customer has booked into a hotel. At the start of the day that the customer is due to check in the hotel sends a message offering a free taxi ride from the airport to the hotel, for delivery only when the customer's cell phone is detected at the local airport, and to delete the message after 24 hours if it has not been delivered. In one implementation the message is an SMS message, and the message is communicated to the phone company via a website. The website allows the hotel/casino to enter the message, the recipients phone number, the rules which in this example are location at which the message will be delivered and an expiry time. The telephone networks detects when the cell phone is detected by one or more of the base stations at the airport, and at that point the message is delivered to the cell phone.

In other embodiments, the sender of the message may specify a delay between detection of the cell phone within the geographic area and delivery of the message. This may be used to allow a visitor flying into the area to perceive a delay between arriving and receiving the first message. Also, the website may allow the sender to send multiple messages and specify a minimum time between delivery of each message.

In other embodiments, when the message is transmitted to and received by the cell phone a receipt message is sent back to the sender of the message, indicating that the message had been received. The receipt message may be in the form of an email to an address specified by the sender when specifying the message on the website, a message on a webpage indicating deliver status of all messages, or any other means. The hotel/casino may automatically receive these messages and update the hotel booking system to indicate that the customer has arrived in the area and is expected shortly.

Another aspect of this invention is a payment system for the delivery of messages, where the originator specifies how much they will pay for the delivery of the message, and the delivery system selects which messages to deliver based on the value of the offer from one or more originators to the same customer.

Preferably the originator establishes a payment account and budget from which payments will be deducted.

In the preferred implementation of the invention, multiple businesses compete to send advertisements to each customer, but a number of advertisements that may be delivered is limited by the limited tolerance of customers to advertising, or limited simply to increase the price. The message delivery company selects the best offers and delivers only those messages.

In another implementation of the invention, a person will ask to receive information, offers, or advertisements from a company as an SMS on their cell phone, but limits the delivery of those messages to when they are most relevant. For example, they might like to be informed of discount offers from a restaurant, but only when they are in the area of the restaurant. At all other times such an offer would be unwanted. Preferably messages are sent from the business to each of the cell phones via the message delivery service together with the individual delivery rules, and only those messages that meet the rules are delivered. Prior to this invention the person would probably choose not to receive any messages at all rather than to receive messages that are not useful, especially as the number of messages grows larger. Another example is for messages to be delivered only at certain times of the month, such as just after pay day, or when the recipient's bank balance is above a specified limit.

It will be appreciated that this aspect of the invention may be used for other purposes than those described and is not restricted to hotels and casinos.

Taxi from Airport to Hotel

In an alternate implementation of the invention a customer detected at an airport is sent an offer on their cell phone for a free taxi ride to their hotel. The message includes human readable details of the offer and an identification code as text and/or barcode. Preferably the customer shows the message to the taxi driver who records the ID (from the text or scanning the barcode), which he uses to confirm the offer is valid and redeem the cost of the trip from the hotel. The hotel confirms the customer arrived when they check in, and/or when their phone is detected at the casino.

An example of the message sent to a customer at the airport is "Free taxi trip from Airport to Casino XYZ today only. Please present this message to your driver. Offer #23412634". The driver may redeem the cost of the trip from the hotel either during the trip by contacting the hotel or an intermediary for the hotel (such as the office of the taxi company) and presenting the ID code for confirmation, on arrival at the hotel, or at a later time and when a number of trips are redeemed together. Fraud by passengers may be prevented by confirming at least some of the codes while the passenger is still with the taxi driver. If the driver confirms the code while the passenger is present only 10% of the time then there is only a 10% change of fraud being caught, but it may be considered too risky to attempt. Fraud by drivers is prevented by checking the codes have been issued to customers, and confirming the code received from taxi drivers match the codes sent to customers who arrived at the hotel.

In the case where the taxi advises the hotel while en-route to the hotel, and the hotel implements a number plate recognition system, the license plate number of that taxi is known by the hotel, then the arrival of the customer can be detected and the customer appropriately greeted as described elsewhere.

What is claimed is:

1. A computer-implemented method for tracking and/or identifying persons within a casino using a tracking system, comprising:
    under control of one or more computer systems configured with executable instructions, tracking a biometric characteristic of a person on a continuous basis;
    assigning a first probability value corresponding to a probability that the person is identified correctly based on the biometric characteristic;
    tracking, on a continuous basis, one or more electronic devices within a vicinity of the person, wherein the tracked one or more electronic devices includes one or more of a cell phone or a personal digital assistant, wherein tracking the one or more electronic devices within the vicinity of the person is performed using one or more of cell phone location, Wi-Fi, or other wireless communications protocols;
    assigning a second probability value corresponding to a probability that the person is identified based on the tracked one or more electronic devices;
    correlating, at the one or more computer systems, the first probability value and the second probability value in order to calculate a confidence probability value; and
    identifying, on a continuous basis, the person as a function of the first probability value and the second probability value based on the confidence probability value.

2. The computer-implemented method of claim 1, wherein the tracking the biometric characteristic of the person further includes:
    tracking at least one of a facial characteristic of the person or a voice characteristic of the person;
    analyzing the at least one of the facial characteristic or the voice characteristic of the person; and
    identifying a sub-group of persons to which the person potentially belongs.

3. The computer-implemented method of claim 2, wherein the correlating the first probability value and the second probability value includes excluding the person from the sub-group of persons as a function of the tracked one or more electronic devices or the second probability value.

4. The computer-implemented method of claim 3, wherein the excluding the person from the sub-group of persons includes:
    detecting a location of other electronic devices in other locations within the casino; and
    excluding an associated person with each of the other electronic devices from the sub-group of persons.

5. The computer-implemented method of claim 3, wherein the excluding the person from the sub-group of persons includes using check-in/check-out data from a hotel reservation system.

6. The computer-implemented method of claim 3, wherein the sub-group of persons includes persons who are logged on to gaming machines in other locations of the casino, wherein persons who are logged on to gaming machines are detected using one or more player tracking cards.

7. The computer-implemented method of claim 1, further comprising:
establishing an identity of a particular person through a separate process;
tracking the one or more electronic devices near the particular person during the separate process; and
associating the tracked one or more electronic devices with the particular person.

8. The computer-implemented method of claim 7, wherein the separate process is a check-in process of the particular person at a hotel associated with the casino.

9. The computer-implemented method of claim 8, including assigning the particular person to a room in the hotel away from other persons checking in to the hotel at the same time.

10. The computer-implemented method of claim 9, wherein the assigning the particular person to a room away from the other persons includes assigning the particular person to a room on a different floor from the other persons.

11. The computer-implemented method of claim 7, wherein the separate process is the use, by the particular person, of a credit card.

12. The computer-implemented method of claim 7, wherein the associating the tracked one or more electronic devices with the particular person includes:
tracking movement of the tracked one or more electronic devices as the particular person moves away from a location associated with the separate process; and
associating the tracked one or more electronic devices with the particular person.

13. The computer-implemented method of claim 1, further including associating the tracked one or more electronic devices with a particular person when the particular person uses a credit card and is identified.

14. The computer-implemented method of claim 1, wherein the tracking the one or more electronic devices within the vicinity of the person includes sensing the tracked one or more electronic devices.

15. The computer-implemented method of claim 1, wherein an identity of the person is established using cell phone company records when one of the tracked one or more electronic devices includes a cell phone.

16. The computer-implemented method of claim 1, further comprising:
establishing a first biometric probability of a match with a first person as a function of the biometric characteristic; and
establishing a first electronic device probability of a match with the first person as a function of the tracked one or more electronic devices.

17. The computer-implemented method of claim 16, further comprising:
establishing a second biometric probability of a match with a second person as a function of the biometric characteristic; and
establishing a second electronic device probability of a match with the second person as a function of the tracked one or more electronic devices.

18. The computer-implemented method of claim 17, further comprising:
multiplying the first biometric probability and the first electronic device probability together and establishing a combined first probability;
multiplying the second biometric probability and the second electronic device probability together and establishing a combined second probability;
comparing the combined first probability and the combined second probability; and
based at least in part on the comparison, identifying the person as the first person or the second person.

19. A computer-implemented method of tracking and/or identifying persons within a casino using a tracking system, comprising:
under control of one or more computer systems configured with executable instructions,
tracking, on a continuous basis, a tracked biometric characteristic of one of the persons using a tracking system;
analyzing the tracked biometric characteristic of the one of the persons;
identifying a sub-group of the persons to which the one of the persons potentially belongs;
assigning a first probability value corresponding to a probability that the person is identified correctly based on the tracked biometric characteristic;
tracking, on a continuous basis, one or more electronic devices within a vicinity of the one of the persons, wherein the tracked one or more electronic devices includes one or more of a cell phone or a personal digital assistant, wherein tracking the one or more electronic devices within the vicinity of the person is performed using one or more of cell phone location, WiFi, or other wireless communications protocols;
assigning a second probability value corresponding to a probability that the person is identified based on the tracked one or more electronic devices;
correlating the first probability value and the second probability value in order to calculate a confidence probability value; and
identifying, on a continuous basis, the one of the persons as a function of the first probability value and the second probability value based on the confidence probability value.

20. The computer-implemented method of claim 19, wherein the tracking the tracked biometric characteristic of the one of the persons includes tracking at least one of a facial characteristic of the one of the persons or a voice characteristic of the one of the persons.

21. The computer-implemented method of claim 19, wherein the correlating the tracked biometric characteristic of the one of the persons and the tracked one or more electronic devices includes excluding persons from the sub-group of the persons as a function of the tracked one or more electronic devices.

22. The computer-implemented method of claim 19, further comprising:
establishing a first biometric probability of a match with a first person as a function of the tracked biometric characteristic; and
establishing a first electronic device probability of a match with the first person as a function of the tracked one or more electronic devices.

23. The computer-implemented method of claim 22, further comprising:
establishing a second biometric probability of a match with a second person as a function of the tracked biometric characteristic; and
establishing a second electronic device probability of a match with the second person as a function of the tracked one or more electronic devices.

24. The computer-implemented method of claim 23, further comprising:

multiplying the first biometric probability and the first electronic device probability together and establishing a combined first probability;

multiplying the second biometric probability and the second electronic device probability together and establishing a combined second probability;

comparing the combined first probability and the combined second probability; and based at least in part on the comparison, identifying the one of the persons as the first person or the second person.

25. A computer-implemented method of tracking and/or identifying persons within a casino using a tracking system, the tracking system for storing information related to the persons including one or more electronic devices, which may be carried by each person, comprising:

under the control of one or more computer systems configured with executable instructions, associating the one or more electronic devices with a particular person during a process when the particular person has been identified at an associated location, wherein the one or more electronic devices includes one or more of a cell phone or a personal digital assistant;

tracking, on a continuous basis, movement of the one or more electronic devices as the particular person moves away from the associated location, wherein tracking the one or more electronic devices within a vicinity of the person is performed using one or more of cell phone location, WiFi, or other wireless communications protocols;

associating the tracked one or more electronic devices with the particular person;

storing information about the tracked one or more electronic devices in a database of the tracking system as being associated with the particular person, the database including biometric data and/or related electronic device information;

tracking, on a continuous basis, a tracked biometric characteristic of the particular person;

analyzing the tracked biometric characteristic of the particular person;

identifying a sub-group of the persons to which the particular person potentially belongs;

assigning a first probability value corresponding to a probability that the person is identified correctly based on the tracked biometric characteristic;

sensing one or more electronic devices within the vicinity of the particular person on a continuous basis;

assigning a second probability value corresponding to a probability that the person is identified based on the tracked one or more electronic devices;

correlating the first probability value and the second probability value in order to calculate a confidence probability value; and identifying, on a continuous basis, the particular person as a function of the first probability value and the second probability value based on the confidence probability value.

* * * * *